Figure 1:
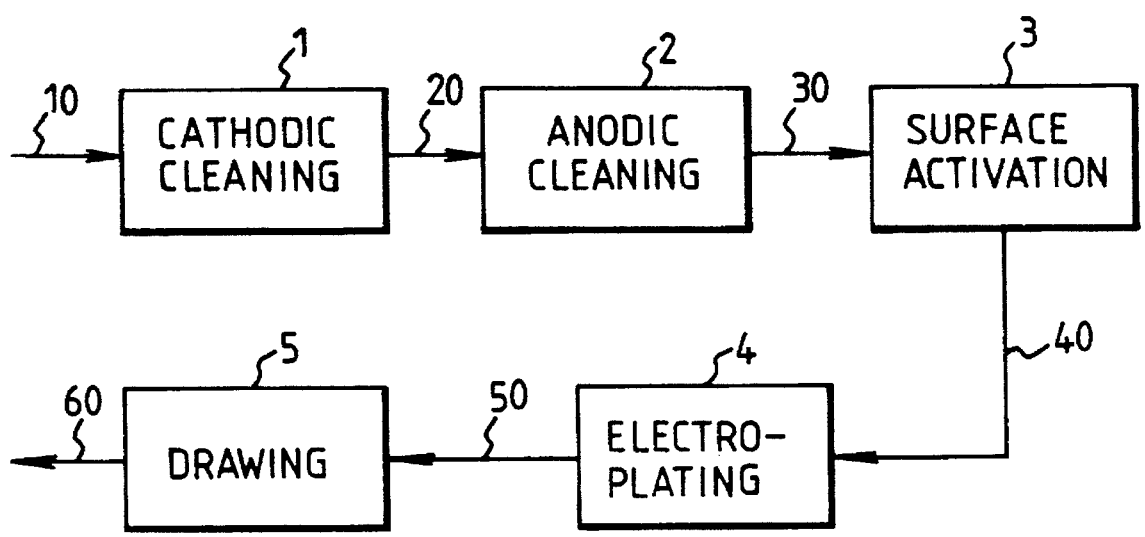

United States Patent
Mihara et al.

[11] Patent Number: 5,622,612
[45] Date of Patent: Apr. 22, 1997

[54] METHOD OF PREPARING CURRENT COLLECTORS FOR ELECTROCHEMICAL CELLS

[75] Inventors: David R. Mihara, Surrey; Stephen J. Rose, Essex; Robert E. Gustar, West Chiltington, all of Great Britain; David V. Adamson, Ashland, Mass.; Paul Barton, Haywards Heath, Great Britain

[73] Assignee: Duracell Inc., Bethel, Conn.

[21] Appl. No.: 553,254

[22] PCT Filed: May 18, 1994

[86] PCT No.: PCT/US94/05571

§ 371 Date: Nov. 16, 1995

§ 102(e) Date: Nov. 16, 1995

[87] PCT Pub. No.: WO94/28590

PCT Pub. Date: Dec. 8, 1994

[30] Foreign Application Priority Data

Jun. 2, 1993 [GB] United Kingdom .................... 9311336

[51] Int. Cl.$^6$ .............. H01M 6/00; C25D 5/48; B21C 23/26
[52] U.S. Cl. ............ 205/138; 29/623.5; 29/527.2; 29/DIG. 11; 29/DIG. 12; 72/47; 205/222; 205/261
[58] Field of Search .................... 205/138, 222, 205/261; 29/623.1, 623.3, 623.5, 825, 885, 527.2, 730, 731, 415, 417, DIG. 11, DIG. 12; 72/47, 274, 275

[56] References Cited

U.S. PATENT DOCUMENTS

| | | | |
|---|---|---|---|
| 2,288,762 | 7/1942 | Winkler | 72/47 |
| 2,370,973 | 3/1945 | Lang | 72/39 |
| 2,458,839 | 1/1949 | Dyer, Jr. et al. | 204/45 |
| 2,580,801 | 1/1952 | Leonard | 205/140 |
| 4,143,209 | 3/1979 | Gerspacher et al. | 428/592 |
| 4,195,120 | 3/1980 | Rossler et al. | 429/50 |
| 4,645,718 | 2/1987 | Dambre | 428/625 |
| 4,740,435 | 4/1988 | Markin et al. | 429/174 |
| 5,270,128 | 12/1993 | Reichert et al. | 429/29 |
| 5,279,905 | 1/1994 | Mansfield, Jr. et al. | 429/27 |

OTHER PUBLICATIONS

F. A. Lowenheim, Electoroplating, McGraw–Hill Book Company, New York, 1978, pp. 78–88, 348–350. No month available.

*Primary Examiner*—Kathryn L. Gorgos
*Assistant Examiner*—William T. Leader
*Attorney, Agent, or Firm*—Robert J. Feltovic; Rose M. Allen; Barry D. Josephs

[57] ABSTRACT

A process is recited for plating elongated current collectors with indium. The current collectors have particular utility in alkaline electrochemical cells, particularly zinc/manganese dioxide alkaline cells containing "zero-added" mercury. The process of the invention involves electroplating conductive wire with indium and then drawing the plated wire to a lesser diameter. The drawn plated wire may then be cut to the desired lengths, typically in the shape of a nail, for use as current collectors within the alkaline cell.

9 Claims, 1 Drawing Sheet

METHOD OF PREPARING CURRENT COLLECTORS FOR ELECTROCHEMICAL CELLS

The invention relates to alkaline electrochemical cells and a method of preparing indium plated current collectors for such cells.

Alkaline electrochemical cells are used to power a variety of devices such as flashlights, radios, and other electronic devices. These cells contain a zinc anode, an alkaline electrolyte, a manganese dioxide ($MnO_2$) cathode, and an electrolyte permeable separator film, typically of cellulose. The anode contacts the negative terminal and the $MnO_2$ cathode contacts the positive terminal. In the past the zinc anode has been amalgamated with mercury. It is desired to produce alkaline cells with reduced mercury for example "substantially mercury-free" or "zero-added" mercury cells, for environmental concerns. ("Substantially mercury-free" cells are herein defined as containing less than about 50 parts mercury per million parts total cell weight and "zero-added" mercury cells are defined as cells containing no added amounts of mercury, commonly resulting in less than about 10 parts mercury per million parts total cell weight.) In practice it has been difficult to find environmentally compatible substitutes for mercury.

A metal current collector in the shape of a wire or nail is inserted into the anode material and conducts electric current evenly from the zinc to the anode terminal. The current collector is typically made of brass or copper but may also be composed of cadmium, pure zinc or other metals. A current collector nail is typically made by cold-forming brass or copper wire to the desired shape and then cutting the wire to the desired length. It is known to coat the nail with other metals, for example, lead, indium, cadmium and gallium. The coated nail reduces the amount of gassing which may occur in the cell, especially in "substantially mercury-free" or "zero-added" mercury cells. Indium is an attractive coating material for the collectors because it is less of an environmental hazard than lead, cadmium, gallium and mercury.

The invention will be better understood with reference to the drawings in which:

FIG. 1 is a schematic flow diagram depicting the process steps of the invention.

In the process of the present invention, brass, copper or other conventional current collector wire is electroplated with indium before the wire is cold-formed and cut into individual current collectors, typically in the shape of a nail. The indium plated wire is then cold-formed to form a head portion for each current collector by using a punch and die, followed by cutting the wire to form individual collectors. After plating the wire, but prior to cold-forming and cutting it into individual current collectors, the wire is drawn-down to the desired collector diameter. The final collector diameter may vary depending on the size of the cell. The draw-down may typically be to a diameter which is between about 85 and 95 percent of the diameter of the plated wire before drawing. Surprisingly, although the wire has been plated with indium before draw-down, the drawing does not impair the degree of surface smoothness or continuity of the indium plate thereon. In fact the draw-down increases uniformity in the plated surface and enhances its smoothness and luster. The draw-down also increases adhesion of the plating to the wire. These enhanced properties are believed to increase the effectiveness of the plated current collectors in reducing cell gassing and in reducing load voltage instability during cell discharge.

In the process of the invention, wire 10 (FIG. 1) is passed to a cleaning step 1 primarily to remove grease and oil deposits from its surface. The wire is typically of brass, in its unburnished state, and may typically have a diameter between about 1.3 and 1.9 mm. Electrolytic (cathodic) cleaning is preferred wherein the wire is the cathode (negative electrode) and stainless steel may be the anode (positive electrode). The electrolyte may be an aqueous solution of sodium hydroxide or other commercially available alkaline cleaner. The wire may be subjected to cathodic cleaning by passing a direct current between the electrodes at a current density between about 50 and 100 amp. per sq. ft., typicaly about 80 amp. per sq. ft. of wire surface for about 2 to 10 seconds, while maintaining the bath at a temperature between about 45° to 65° C. The cathodic cleaning removes grease, oil and surface particles from the wire.

The cleaned wire 20, may then be passed from step 1 to a second cleaning step 2 wherein the wire is subjected to anodic electrolytic cleaning which removes surface oxides from the wire surface. In this step the electrolyte bath may be an aqueous solution of sulfuric acid or other inorganic acid. The wire forms the anode (positive electrode) and stainless steel may be used for the cathode. The wire may be subjected to electrolytic cleaning in step 2 by passing a direct current between the electrodes at a current density of about 50 amp per sq. ft. of wire surface for about 3 seconds while maintaining the bath at about ambient temperature (21° C.).

The anodically cleaned wire 30, may then be passed to a step 3 wherein the wire surface is activated by acid treatment. In this step the wire may be treated with sulphamic acid ($HSO_3NH_2$) at ambient temperature, typically for about 1 second. This causes the wire surface to become slightly roughened or etched to make it more receptive to indium plating.

The wire 40 from step 3, may then be passed to step 4 wherein indium is electroplated onto the wire's surface. The plating is effected in step 4 by subjecting the wire to electrolysis, wherein the wire forms the cathode (negative electrode) and indium (99.99% pure), forms the anode, in an electrolyte bath of an aqueous solution of indium sulphamate ($In(SO_3NH_2)_3$) at a concentration between about 50 and 100 gm of indium metal/liter. The plating is accomplished in step 4 by passing a direct current between the electrodes at a current density of between about 50 and 150 amp. per sq. ft., preferably between about 90 and 110 amp. per sq. ft. of wire surface. The plating is conducted for a period of time, typically about 3 seconds or somewhat longer, sufficient to produce a layer of indium of between about 0.5 and 10 micron, typically about 1 micron thickness on the wire.

The plated wire 50, is then passed to step 5 wherein it is drawn-down to a diameter which is between about 85 and 95% of its original diameter. The draw-down is accomplished by pulling the wire through an aperture of desired diameter in a hard material, preferably diamond. The draw-down is carried out under ambient conditions. The drawn wire is cold-formed and cut to form individual current collectors for use in alkaline cells, typically conventional $Zn/MnO_2$ alkaline cells containing "zero-added" mercury.

The following is a specific example of the process of the invention:

EXAMPLE 1

Brass wire (70 wt.% copper; 30 wt.% zinc) having a diameter of 1.46 mm and in an unburnished state is passed to a first cleaning step (the wire may be in a burnished or partially burnished state at this point, but such condition is rendered unnecessary by the present process) where it is cathodically cleaned as above described using an aqueous solution of sodium hydroxide as the electrolyte bath. This step serves to remove oil, grease and dirt from the wire's surface.

The wire is then passed to a second cleaning step wherein it is anodically cleaned in the manner above described. An electrolysis bath is used containing 20 vol. % sulfuric acid, to remove remaining surface oxides. The cleaned wire is then subjected to a third step involving surface activation by acid treatment. This is a non-electrolytic step whereupon the wire is passed through a solution of 10 vol. % of sulphamic acid at ambient temperature for one second. This treatment serves to prepare the wire surface for indium electroplating by causing the surface to become slightly roughened or etched.

The wire is then passed to a fourth step wherein indium is electroplated onto the wire's surface. In the electroplating step the wire forms the cathode (negative electrode). The anode (positive electrode) is formed of indium (99.99 wt. % pure). The electrolyte bath is an aqueous solution of indium sulphamate at a concentration of 60 gm indium metal/liter. The electrolyte bath also contains 50 gm of sodium chloride/liter. The bath temperature is kept below 30° C. The plating is carried out at a current density of 100 amp/sq. ft. of wire surface. The driving voltage is regulated to about 12 volts to produce this desired current density. The electroplating is carried out for 7 seconds to form a layer of indium of about 1 micron thickness on the brass wire.

In a fifth step, the wire is drawn-down from its original diameter of about 1.46 mm to about 1.39 mm by pulling through a diamond orifice of 1.39 mm diameter. Although the wire is drawn down to about 5% reduction in diameter, the plated thickness of indium on the wire remains essentially unchanged at about 1 micron. Surprisingly, the drawing causes no disruption in the indium surface continuity or integrity. To the contrary, the draw-down produces a noticeably higher smoothness and visibly greater luster of the plated wire surface. It also increases adhesion of the plating to the wire surface.

The following examples illustrate the advantages derived from application of the indium coated current collectors made by the process of the invention. (All compositions are by weight unless otherwise specified.)

Comparative Example A

A conventional zinc/manganese dioxide alkaline size AA cell is prepared with conventional cathode active material, electrolyte and separator membrane as illustrated in U.S. Pat. No. 4,740,435, wherein the anode forms the central core of the cell, the cathode is located around the anode with the separator membrane therebetween. The cell has "zero-added" mercury and contains less than 10 parts mercury per million parts total cell weight. The anode current collector is a brass nail plated with lead. The plated nail has a diameter of 1.39 mm and a length of 31 mm. The cathode is an admixture of electrolytic manganese dioxide, graphite and an aqueous solution of KOH. The separator membrane is a conventional electrolyte permeable membrane. The electrolyte is an aqueous solution of KOH containing 40 wt % KOH and a small amount of ZnO conventionally employed in such electrolyte. The anode is a zinc slurry containing mercury free zinc alloy powder conventionally used in alkaline cells containing "zero-added" mercury. The zinc powder is a 99.9 wt % zinc alloy containing about 1000 ppm indium. The zinc slurry also contains aqueous KOH solution, acrylic acid copolymer (CARBOPOL) as gelling agent; and a small amount of an organic surfactant (an organic phosphate ester surfactant sold under the trade designation GAFAC RA600, as described in U.S. Pat. No. 4,195,120).

The cell in this example produces a nominal voltage of about 1.5 volts and is discharged under a 3.9 ohm load. The cell is tested for shock resistance and voltage stability by tapping or jolting the cell over the cell discharge life. A voltage drop usually between about 600 and 800 millivolts (average about 700 millivolts) typically occurs upon impact.

The cell in this example evolves 2.5 milliliters of hydrogen at 71° C. over a period of 4 weeks before discharge. (Holding cells at 71° C. (160° F.) for a period of one week may be equivalent to about one year of shelf-life of such cells at room temperature.) This volume of hydrogen gas evolution is considered to be unacceptably high.

EXAMPLE 2

The same AA alkaline cell as in Comparative Example A is prepared with "zero-added mercury" and containing less than 10 parts mercury per million parts total cell weight and is identical in every respect to the cell in Comparative Example A, except that the anode current collector is an indium plated brass nail made by the above described process of the invention. The nail is formed by drawing-down indium plated wire from a diameter of 1.46 mm to 1.39 mm and then cold-forming and cutting it to a length of about 31.5 mm as described in the process of the invention. The plated indium on the brass nail has a thickness of about 1 micron.

The cell in this example produces a nominal voltage of about 1.5 volts and is discharged under a 3.9 ohm load. The cell is tested for voltage stability by tapping or jolting it over the cell discharge life. A voltage drop typically between about 40 and 100 millivolts (average about 50 millivolts) occurs upon impact which is significantly less than that encountered in Comparative Example 2.

The cell in this example evolves about 0.04 milliliters of hydrogen at 71° C. over a period of 4 weeks before discharge.

This gassing level is significantly less than that of Comparative Example 2 and represents a commercially acceptable level.

Although the present invention is described with respect to preferred embodiments, it should be recognized that other embodiments are possible without departing from the concept of the invention. For example, other cleaning methods are possible for cleaning the wire and removing surface oxides prior to electroplating. Modifications to the electroplating solution may also be possible. Therefore, the present invention is not intended to be limited to the specific embodiments, but rather is defined by the claims and equivalents thereof.

What is claimed is:

1. A method of manufacturing a plurality of elongated current collectors for alkaline electrochemical cells having an anode and a cathode comprising the steps of:

a) electroplating a metal conductive wire with indium to form an indium plated wire, wherein the indium plating on said conductive wire has a thickness of between about 0.1 and 10 micron; and b) drawing the indium plated wire formed in step a) to reduce the diameter thereof; and c) inserting the drawn indium plated wire into said anode.

2. The method of claim 1 wherein the drawing in step b) reduces the diameter of the plated wire by between about 5 and 15 percent of the diameter of said plated wire formed in step a).

3. The method of claim 1 wherein the electroplating in step a) is carried out by immersing said conductive wire in an electrolyte bath comprising an aqueous solution of indium sulphamate, said conductive wire forming the cathode (negative electrode) and indium forming the anode (positive electrode); and passing direct current between said electrodes, whereupon indium plates onto said conductive wire.

4. The method of claim 3 wherein the electrolyte bath comprises a concentration of indium sulphamate yielding between about 50 and 100 gm/liter of indium metal.

5. The method of claim 3 wherein the current passed between said electrodes has a current density between about 50 and 150 amp. per sq. ft. of wire surface.

6. A method according to claim 1 wherein prior to step a) the surface of the conductive wire is cleaned to remove surface dirt and oxide.

7. A method according to claim 6 wherein said wire is electrolytically cleaned.

8. A method according to claim 7 wherein the surface of said wire is anodically activated prior to said electroplating.

9. A method according to claim 1 wherein the thickness of said plated indium is not reduced by said drawing.

\* \* \* \* \*